(No Model.)
N. L. GANO.
SAW TOOTH SWAGE.
No. 280,598. Patented July 3, 1883.
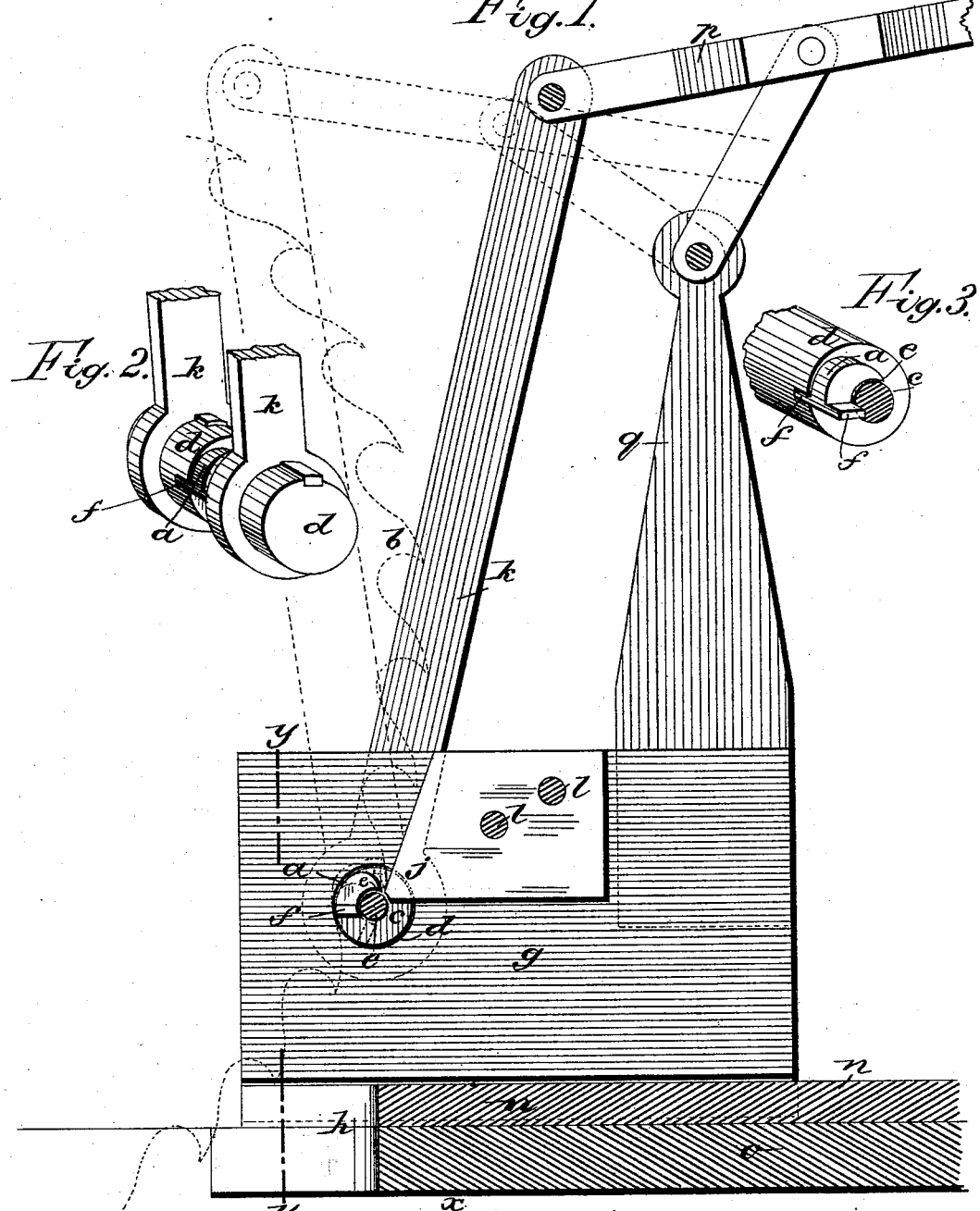
WITNESSES:
INVENTOR:
N. L. Gano
BY
ATTORNEYS.

UNITED STATES PATENT OFFICE.

NATHAN L. GANO, OF FERNANDINA, FLORIDA.

SAW-TOOTH SWAGE.

SPECIFICATION forming part of Letters Patent No. 280,598, dated July 3, 1883.

Application filed January 9, 1883. (No model.)

*To all whom it may concern:*

Be it known that I, NATHAN L. GANO, of Fernandina, in the county of Nassau and State of Florida, have invented a new and Improved Saw-Tooth Swage, of which the following is a full, clear, and exact description.

My invention consists of swaging-dies contrived to swage the points of saw-teeth from the inside outward, to widen and sharpen them for use, whereby the material of the saw-plate will not be wasted as fast as otherwise. The teeth have better pitch, and the tendency of the device is to gage the points of the teeth of a circular saw to a true circle, all as hereinafter fully described.

Reference is to be had to the accompanying drawings, forming part of this specification, in which similar letters of reference indicate corresponding parts in all the figures.

Figure 1 is a sectional elevation of my improved swaging device, taken on the line $xx$ of Fig. 4. Fig. 2 is a perspective view of the die for acting upon the inside of the teeth, and part of the means for operating it. Fig. 3 is a detail of Fig. 2 in perspective view, and Fig. 4 is a partial section of Fig. 1 on line $yy$.

$a$ represents the die for acting on the inside of the saw-teeth $b$. It is fitted in a groove, $c$, of a roller, $d$, with its point $e$ resting on the bottom of the groove, and is secured in position by its T-head $f$, fitted in radial and longitudinal slots of the roller opening into said groove. The roller $d$, with the die, is fitted in the plates $g$, arranged side by side, with a space, $h$, between them for the saw, and having the die $j$ for acting on the outside of the teeth secured between them, so that a turn of roller $d$ by the levers $k$ will swage the point of a tooth placed between them, as clearly shown in Fig. 1. The said plates $g$ are bolted together through die $j$ by bolts $l$, which may be readily removed to allow the die to be changed, if desired. Die $a$ may also be taken out readily for substituting another, if desired. The plates $g$ have dovetail flanges $m$, fitted to shift forward and backward on a cleat, $n$, attached to any suitable base-plate, $o$, to allow the saw-teeth to pass when the saw is arranged on a mandrel in its bearings. In this case, a suitable stop being provided by which to set the swage, it will gage the teeth of a circular saw to a true circle. Any suitable clamp may be employed for holding the plates $g$ while the dies are worked. The levers $k$ are connected to a suitable lever, $p$, which is linked to a standard, $q$, of a plate, $g$, for a fulcrum, making a simple arrangement of operating devices for the dies; but these may be varied at will.

It will be seen that the machine is very simple, and also cheap, and it is especially useful and economical as to the wear of the saw, in that it swages the teeth outward, so as to increase their length, which makes the saw last longer; and, besides, it gives good clearance to the back of the teeth and the most favorable set to the cutting-edge.

Having thus described my invention, I claim as new and desire to secure by Letters Patent—

1. A saw-swaging die provided with the T-head $f$, in combination with the roll $d$, having a peripheral groove, $c$, to receive the die, and at right angles thereto short grooves to receive the head, whereby the die may be held, as described.

2. The combination, with roll $d$ and plates $g$, of the end-jointed levers $k$ $p$, the latter connected by a link to the top of a standard, $q$, as and for the purpose specified.

3. The curved, pointed, and T-headed die $a$, combined with a grooved and slotted roller, $d$, and levers $k$, substantially as described.

NATHAN L. GANO.

Witnesses:
J. A. EDWARDS,
JOSEPH LIGEOUR.